(12) United States Patent
Hori

(10) Patent No.: US 10,956,103 B2
(45) Date of Patent: Mar. 23, 2021

(54) CONTROL APPARATUS, CONTROL METHOD, AND STORAGE MEDIUM

(71) Applicant: CANON KABUSHIKI KAISHA, Tokyo (JP)

(72) Inventor: Daisuke Hori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/410,301

(22) Filed: May 13, 2019

(65) Prior Publication Data

US 2019/0361646 A1 Nov. 28, 2019

(30) Foreign Application Priority Data

May 24, 2018 (JP) .............................. JP2018-099974

(51) Int. Cl.
*G06F 3/12* (2006.01)
*H04N 1/00* (2006.01)

(52) U.S. Cl.
CPC .......... *G06F 3/1242* (2013.01); *G06F 3/1205* (2013.01); *G06F 3/1208* (2013.01); *H04N 1/0071* (2013.01); *H04N 1/00456* (2013.01)

(58) Field of Classification Search
CPC .... G06F 3/1242; G06F 3/1208; G06F 3/1205; H04N 1/0071; H04N 1/00456
USPC ................................................ 358/1.15, 1.18
See application file for complete search history.

(56) References Cited

U.S. PATENT DOCUMENTS

| 9,274,728 B2 | 3/2016 | Hori | |
| 2003/0020956 A1* | 1/2003 | Goel | G06K 15/02 358/1.18 |
| 2006/0215233 A1* | 9/2006 | Hirai | H04N 1/32122 358/448 |
| 2015/0212771 A1 | 7/2015 | Hori | |

FOREIGN PATENT DOCUMENTS

| JP | 2003-191538 A | 7/2003 |
| JP | 2015-138505 A | 7/2015 |

* cited by examiner

*Primary Examiner* — Tammy Paige Goddard
*Assistant Examiner* — Darryl V Dottin
(74) *Attorney, Agent, or Firm* — Venable LLP

(57) ABSTRACT

Provided is a technique that enables efficient setting of poster printing and efficient processing of an image. To this end, a control apparatus of the present invention is a control apparatus that allows a printing apparatus to print multiple divided images, into which an input image is divided, on print media, including: a setting unit that sets the number of divisions of the input image based on user input; an obtaining unit that obtains a width of the print media; a determining unit that determines a scale factor of the input image based on at least the set number of divisions, the width of the print medium, and a width of the input image; and a display control unit that displays a preview screen of the input image and a processing instruction item for instructing processing of the input image together, in which in a case where processing of the input image is instructed by user operation through the processing instruction item, the display control unit displays a processed input image reflecting the processing based on the processing instruction, and the determining unit determines a scale factor of the processed input image based on a width of the processed input image.

23 Claims, 11 Drawing Sheets

CONTROL APPARATUS, CONTROL METHOD, AND STORAGE MEDIUM

BACKGROUND OF THE INVENTION

Field of the Invention

The present invention relates to a control apparatus and a control method that control printing an image dividedly on multiple print media, and to a storage medium for executing the control method.

Description of the Related Art

There has been a technique called poster printing for printing an image dividedly on multiple print media. Japanese Patent Laid-Open Nos. 2003-191538 and 2015-138505 disclose techniques of the poster printing using a long roll paper.

In Japanese Patent Laid-Open No. 2003-191538, it is necessary to complete drawing data as a base for the poster printing in advance on a general drawing application, and then perform the poster printing. Thus, in a case where a print result such as a divided position of the image is not desired to a user, the user has to go back to a screen provided by the general application again and change the size and the like of the drawn image.

In Japanese Patent Laid-Open No. 2015-138505, in a case where the user checks a print preview of the image and determines a print result as undesirable, the user can change the size and position of the image by dragging the image displayed on the print preview. However, unnecessary white spaces may be formed on a roll paper unless the user appropriately enlarges and arranges the image by him/herself.

SUMMARY OF THE INVENTION

Thus, the present invention provides a technique that enables efficient setting of poster printing and efficient processing of an image.

To this end, a control apparatus of the present invention is a control apparatus that allows a printing apparatus to print multiple divided images, into which an input image is divided, on print media, including: a setting unit that sets the number of divisions of the input image based on user input; an obtaining unit that obtains a width of the print media; a determining unit that determines a scale factor of the input image based on at least the set number of divisions, the width of the print medium, and a width of the input image; and a display control unit that displays a preview screen of the input image and a processing instruction item for instructing processing of the input image together, in which in a case where processing of the input image is instructed by user operation through the processing instruction item, the display control unit displays a processed input image reflecting the processing based on the processing instruction, and the determining unit determines a scale factor of the processed input image based on a width of the processed input image.

According to the present invention, it is possible to implement a control apparatus, a control method, and a storage medium that enable efficient setting of poster printing and efficient processing of an image.

Further features of the present invention will become apparent from the following description of exemplary embodiments with reference to the attached drawings.

DESCRIPTION OF THE EMBODIMENTS

First Embodiment

A first embodiment of the present invention is described below with reference to the drawings. Hereinafter, an embodiment of a computer system that uses layout software and a printer driver to perform poster printing of an image based on drawing data generated by a general application on a roll paper is described with reference to the drawings. The following embodiment is not intended to limit the present invention according to the scope of claims, and not all the combinations of features described in this embodiment are necessarily be required for the solution of the present invention.

Figure 1:
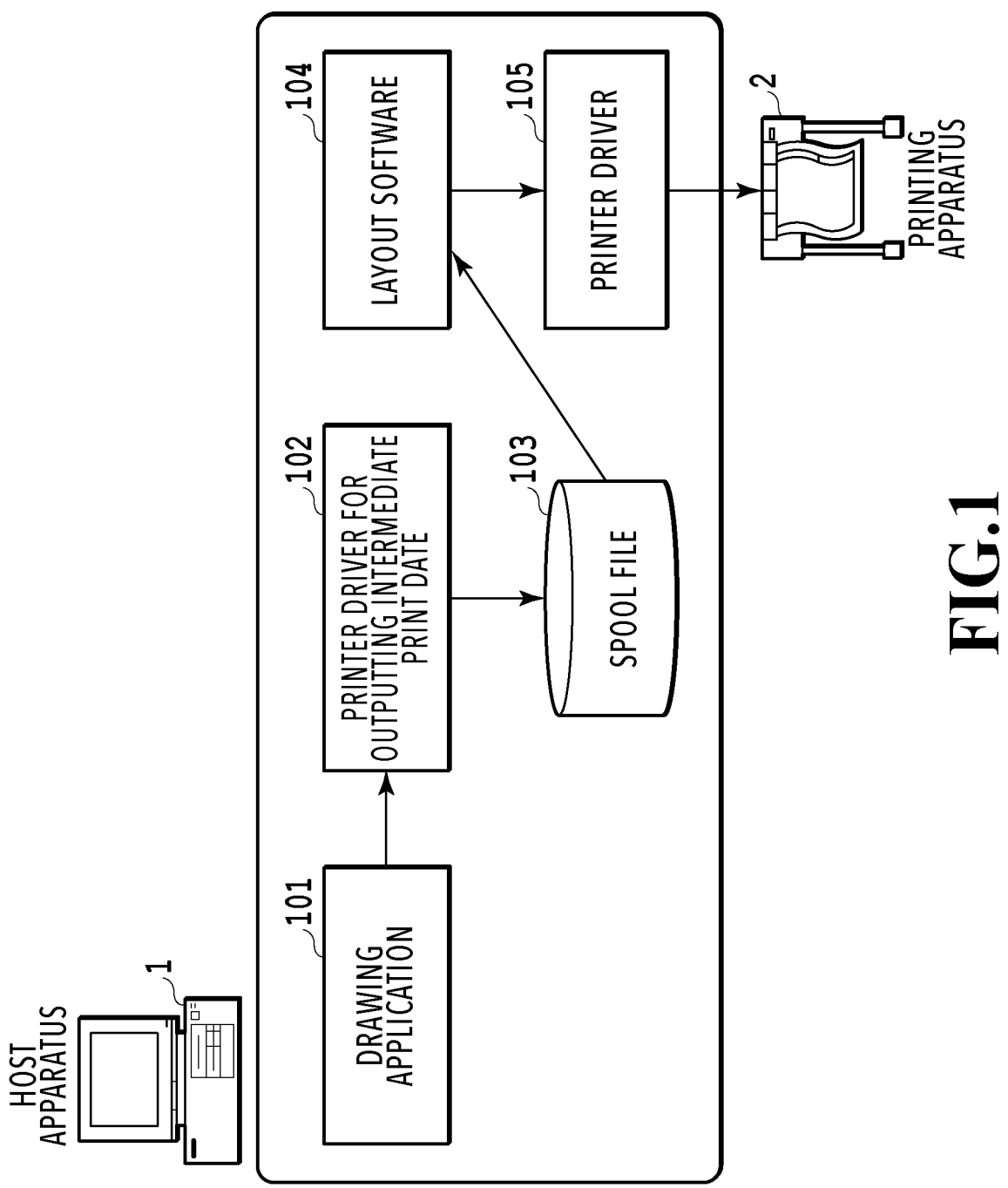
FIG. 1 is a diagram that illustrates a printing system.

FIG. 1 is a diagram that illustrates a printing system 100 to which this embodiment is applicable. The printing system 100 includes a host apparatus 1 and a printing apparatus 2. The host apparatus 1 is an apparatus such as a personal computer and is installed with a general drawing application 101 that can generate drawing data, printer drivers 102 and 105, and layout software 104. The printer driver for outputting intermediate print data 102 is a printer driver that outputs print data as a spool file 103.

In a case of printing with the printing system 100, once a user creates the drawing data with the drawing application 101 and then selects the printer driver for outputting intermediate print data 102, a print request is outputted. In response to the print request, the spool file 103 is outputted as intermediate print data in a predetermined format. The spool file 103 may be outputted to anywhere, such as Temp folder and AppData, which is not particularly limited as long as the later-described layout software 104 can read the spool file 103. The format of the spool file 103 may be XML paper specification (XPS) or enhanced metafile (EMF); however, the format may be any kind as long as the layout software 104 can process the spool file 103.

The layout software 104 is software for performing the poster printing, which reads the spool file 103, displays a preview based on the spool file 103, performs setting of the poster printing, and outputs data to the printer driver 105. The layout software 104 may be run by preparing resident software that monitors the print request to the printer driver for outputting intermediate print data 102 and runs the layout software 104 at the timing of the print request. In addition, the layout software 104 may be run automatically by monitoring output of the spool file 103, or may be run directly by the printer driver for outputting intermediate print data 102, for example.

The printer driver 105 is a general printer driver that forwards print data to the printing apparatus 2. The layout software 104 outputs the intermediate print data to the printer driver 105, and the printer driver 105 generates the print data based on the intermediate print data. The generated print data is transmitted to the printing apparatus 2, and the printing is performed. The printer drivers 102 and 105 may be an integrated single printer driver having a configuration in which the processing can be internally switched.

Thus, with the above-described configuration in which the layout software 104 obtains and edits the intermediate print data, it is possible to perform the poster printing of various formats of data generated by drawing applications such as Microsoft Excel (registered trademark) and AutoCAD (registered trademark) while checking an actual image. That is, with a configuration in which the drawing data is converted to the format of the intermediate print data (e.g., XPS format) and the intermediate print data is inputted to the layout software 104, the layout software 104 can make the print preview using the image based on the drawing data.

In this embodiment, the layout software 104 and the printer driver for outputting intermediate print data 102 can be distributed separately from the printer driver 105. This allows a vendor of printers to release the layout software 104 independently from the printer driver 105.

Figure 2:
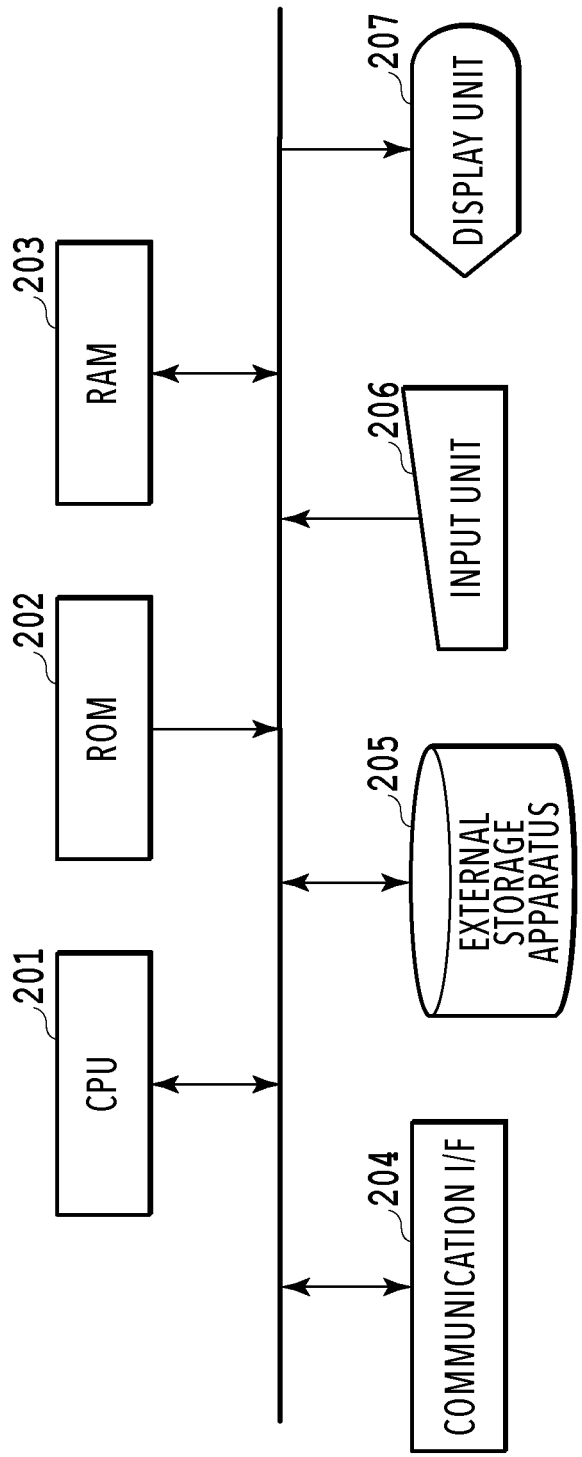
FIG. 2 is a block diagram that illustrates a configuration of a host apparatus.

FIG. 2 is a block diagram that illustrates a configuration of the host apparatus 1. In the host apparatus 1, a CPU 201 as a central processing apparatus, a ROM 202 and a RAM 203 as storage apparatuses, a communication interface 204, an external storage apparatus 205, an input unit 206 such as a mouse and keyboard, and a display unit 207 such as a CRT and LCD are connected to each other via a bus line. The CPU 201 controls the entirety of the host apparatus 1. The ROM 202 stores an initialization program and various kinds of data executed by the CPU 201 at start-up of the host apparatus 1. The RAM 203 is used as a main memory and work space of the CPU 201. The external storage apparatus 205 is made of a hard disk (HDD) and the like and stores the drawing application 101, printer drivers 102 and 105, layout software 104, and various other programs, for example.

The program stored in the external storage apparatus 205 is loaded from the external storage apparatus 205 to be stored in the RAM 203. The user inputs various instructions to the CPU 201 through the input unit 206 such as a keyboard and mouse (user input). The display unit 207 displays various items under control of the CPU 201 (display control). The host apparatus 1 communicates with peripheral apparatuses such as the printing apparatus 2 through the communication interface 204.

Figure 3:
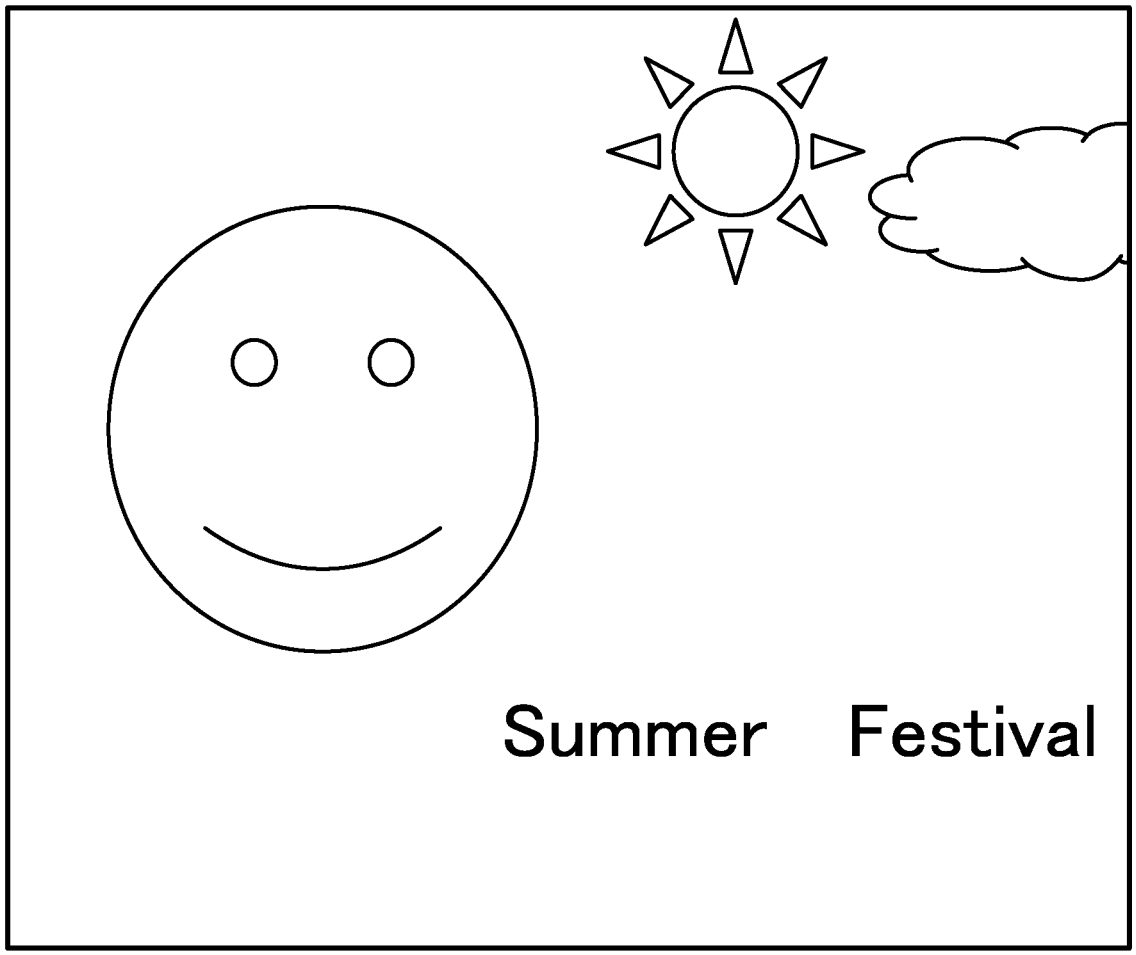
FIG. 3 is a diagram that illustrates an example of an outputted spool file.

FIG. 3 is a schematic diagram that illustrates an example of the spool file 103. The spool file 103 is the intermediate print data based on the drawing data generated by the drawing application 101. In the flow of generating the spool file 103, the drawing application 101 generates the drawing data first, and then the printer driver for outputting intermediate print data 102 is selected from a setting screen provided by the drawing application 101. Thereafter, in response to a print instruction from the user through the screen provided by the drawing application 101, the drawing application 101 outputs the print request. In response to the print request, the selected printer driver for outputting intermediate print data 102 generates the spool file 103 based on the drawing data generated by the drawing application 101.

Figure 4:
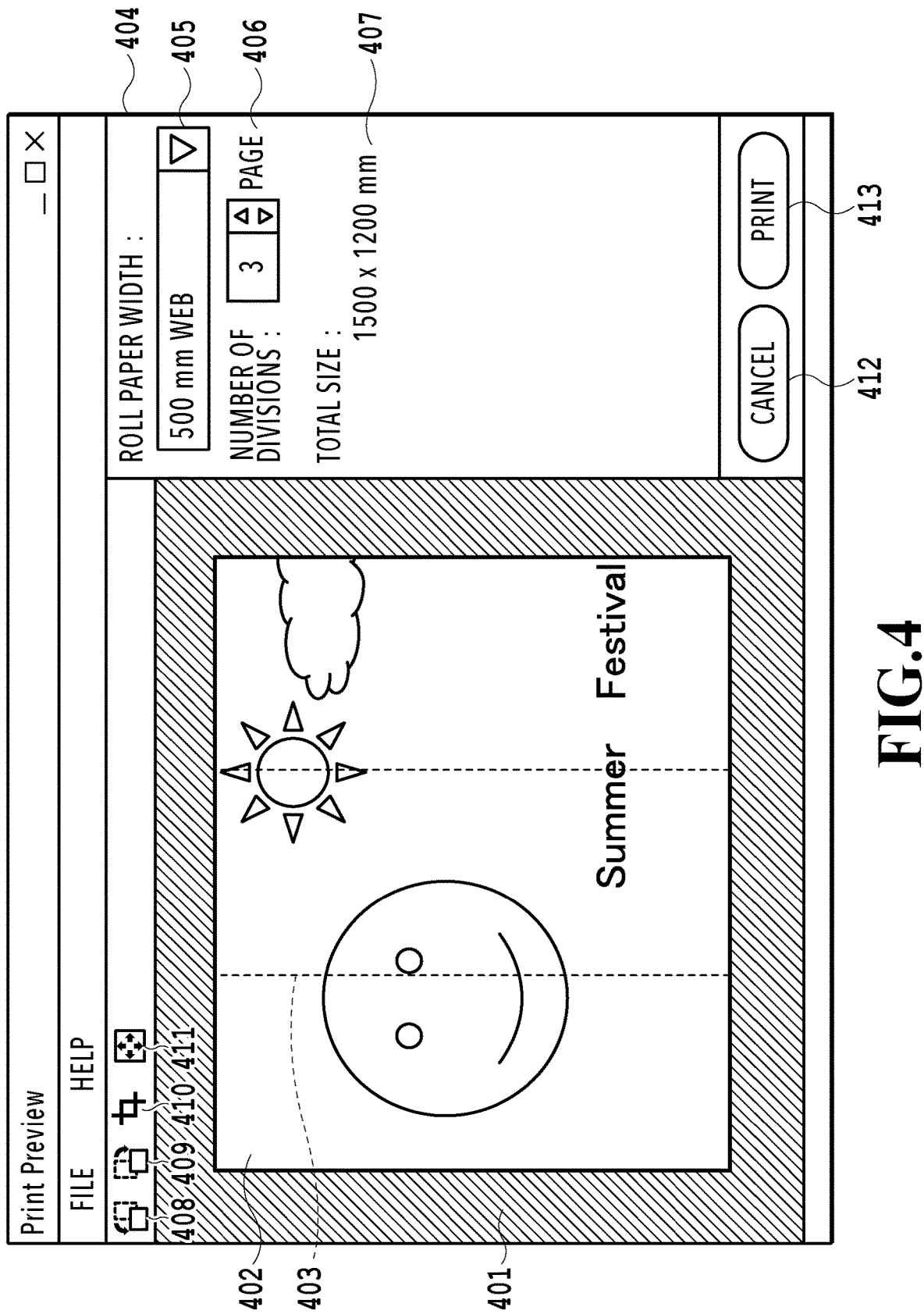
FIG. 4 is a diagram that illustrates an example of a UI screen of layout software.

FIG. 4 is a diagram that illustrates an example of a UI screen of the layout software 104. The layout software 104 obtains the spool file illustrated in FIG. 3 and then displays the obtained spool file as an input image for a preview screen on the screen to accept editing setting by the user. Since the preview screen displays the input image on an image representing a sheet, it is possible to readily imagine the print result (how will the input image be printed on the sheet). In the following descriptions, a method of dividing the input image into multiple images and respectively printing the multiple divided images on multiple sheets may be referred to as the poster printing. The input image is also referred to as a poster image.

The UI screen of the layout software 104 in FIG. 4 includes a region 401 as a display region for the user to check a result of the poster printing, a region 402 as a display region of the input image, and a dividing line 403 as a line dividing the poster. The region 402 displays an image reflecting the editing set through the later-described setting region. The dividing line 403 is a line displayed in accordance with the editing which is set through the later-described region 404 and is a displayed item as a guide indicating the dividing position for dividing the input image into multiple pages in the case of the poster printing.

The region 404 is a region (editing setting region, editing setting screen) that displays control items for the user to perform setting of the poster printing, and the region 404 includes a roll paper width setting item (medium width setting item) 405, a number of poster divisions setting item 406, and a poster total size display region 407. The roll paper width setting item 405 is a combo box for setting the roll paper width to allow the user to set the width of the roll paper used for the printing. The number of poster divisions setting item 406 is a spin box that enables setting of the number of divisions of the poster image, that is, the number of the sheets used for the poster printing.

As described above, this embodiment allows the user to arbitrary select the number of the sheets. In other words, the user can select the number of divisions of the input image (the number of the sheets on which the printing is made). Based on at least the set number of divisions and sheet width, a print region of each of the divided images is obtained. This can avoid appearance of unnecessary white spaces. Since the roll paper is used for the printing in this embodiment, the number of the sheets means the number of sheets cut out from the roll paper. For example, in a case where the input image is divided into three as illustrated in FIG. 4, the divided images are numbered as page 1, page 2, and page 3 in the order from the left and are printed page by page on the roll paper.

Figure 9:
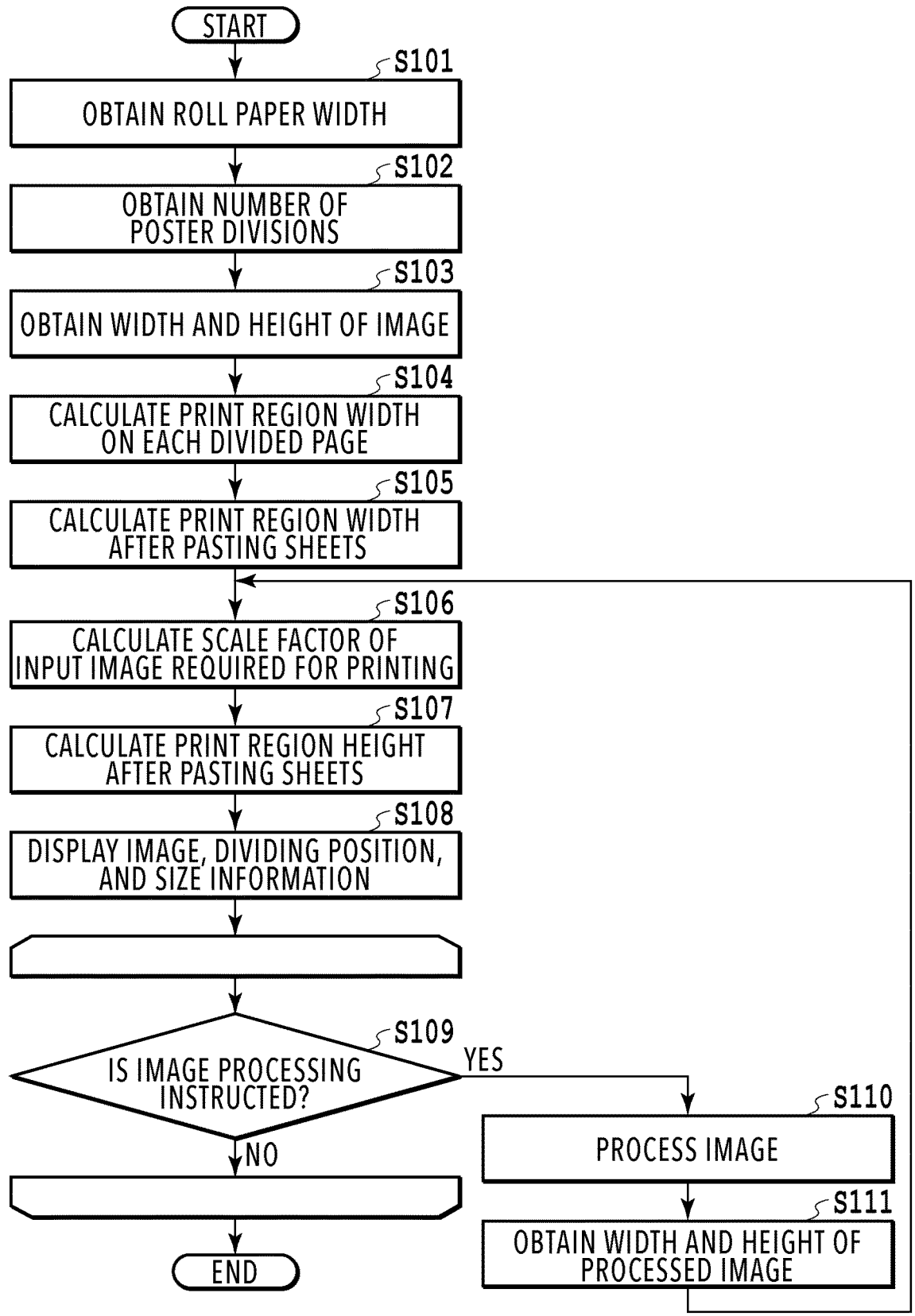
FIG. 9 is a flowchart that illustrates setting processing of printing by the layout software.

The layout software 104 of this embodiment can obtain a width of the print region of each divided image based on at least the number of divisions and sheet width set by the user, and details thereof are described with reference to FIG. 9. If the width of the print region of the divided image is obtained, the dividing position of the image can be obtained. This makes it possible to display the dividing line 403 as guide information indicating the dividing position on the print preview of the input image. As described above, since the width of the print region of the divided image is obtained based on the set number of divisions and sheet width, it is possible to efficiently perform setting of the print region without forming unnecessary white spaces on the sheet supplied to the printing apparatus.

The poster total size display region 407 can display the total size of the printed images. More specifically, the poster total size display region 407 displays an estimate value of the total size of the images on the pasted pages on which the input image is dividedly printed by the poster printing. The value of the total size is calculated according to the later-described flowchart in FIG. 9. The user thus can know the accurate entire size of the printed poster image before the printing, and it is possible to avoid a case such as a print result where the size of the poster is different from the size desired by the user.

A cancel button 412 and a print button 413 are provided on a bottom part of the region 404. In a case where the user wants to cancel the printing, the user can cancel the printing by pressing the cancel button 412. In a case where the editing setting required for the poster printing are all completed, the user can execute the printing by pressing the print button 413.

The UI screen of the layout software 104 further includes a 90-degrees-left-rotation commit button (rotation processing item) 408, a 90-degrees-right-rotation commit button 409, a trimming commit button (trimming item) 410, and a white space removal button (white space removal item) 411 as processing instruction regions (processing instruction items). The user can rotate the image 90 degrees to the left by pressing the 90-degrees-left-rotation commit button (left rotation item) 408 and can rotate the image 90 degrees to the right by pressing the 90-degrees-right-rotation commit button (right rotation item) 409.

Figure 5:
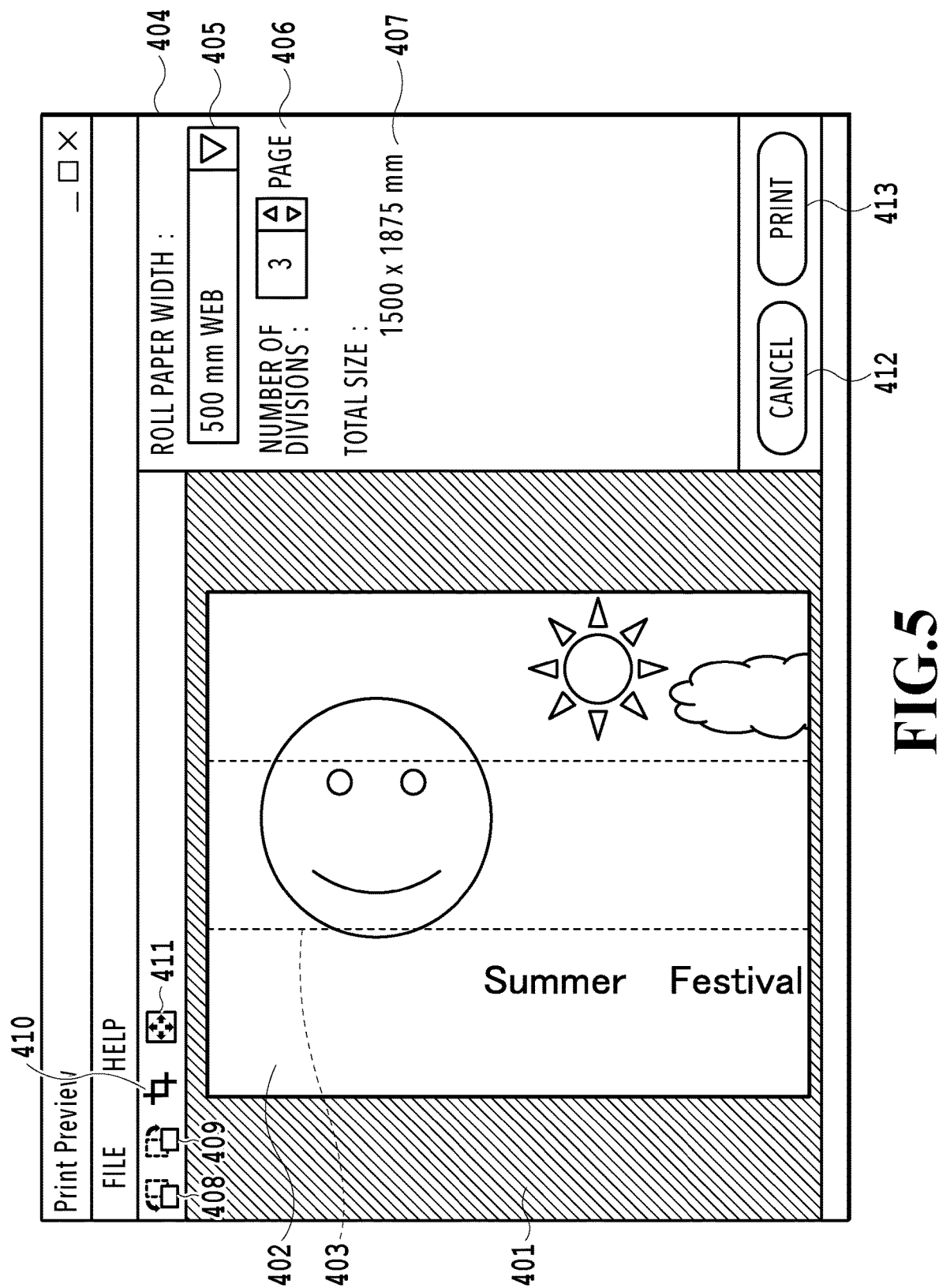
FIG. 5 illustrates the UI screen in a case where a 90-degrees-right-rotation commit button is pressed.

FIG. 5 illustrates the UI screen displayed in a case where the 90-degrees-right-rotation commit button 409 is pressed. This embodiment has a specification that allows the dividing direction of the input image to be changed by rotating the image. This enables the user to change the dividing direction of the input image arbitrary and also to check the divided images immediately on the preview screen of the UI screen of the layout software 104.

Figure 6:
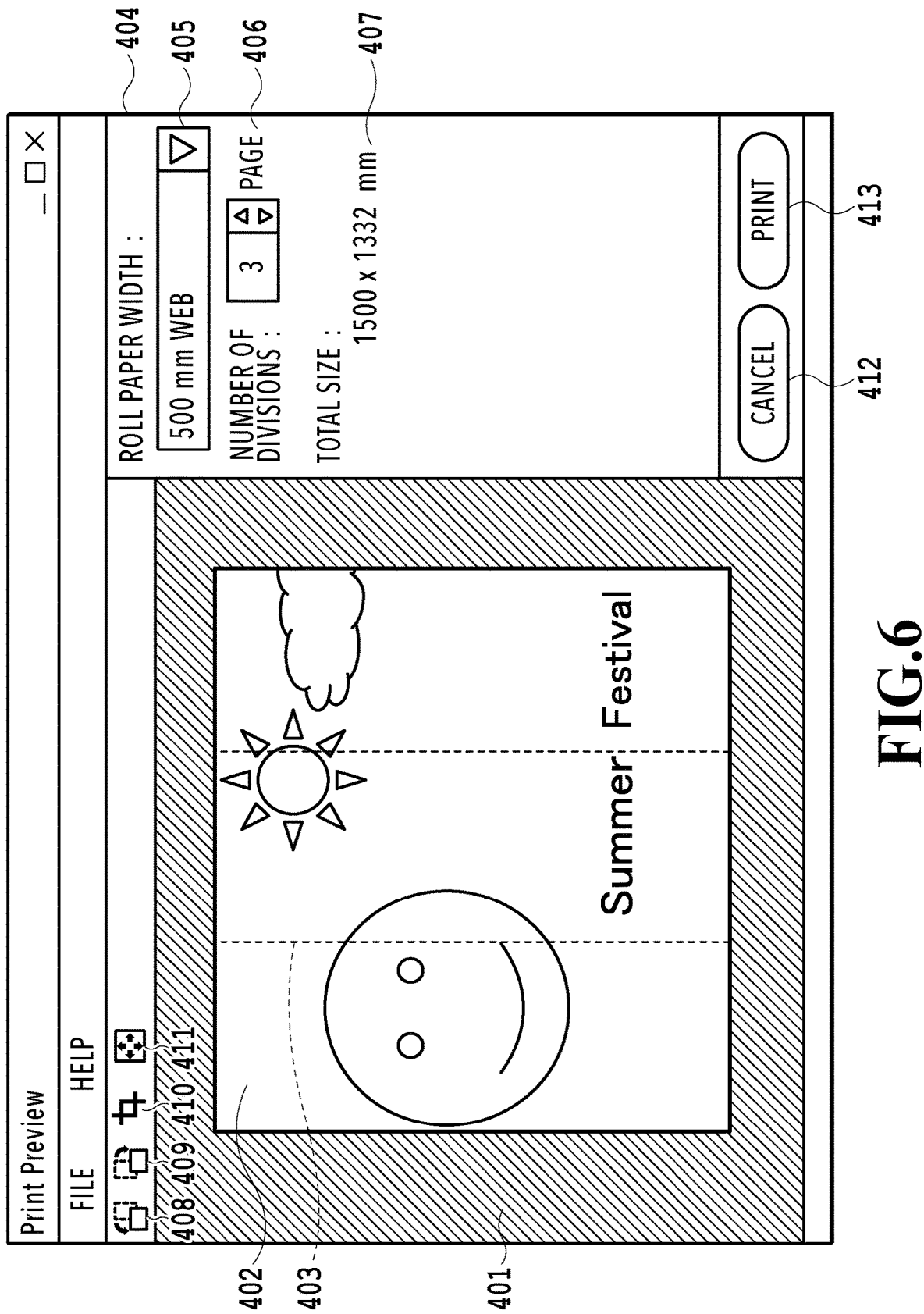
FIG. 6 illustrates the UI screen in a case where an image is trimmed.

FIG. 6 is a diagram that illustrates the UI screen displayed in a case where the image is trimmed by pressing the trimming commit button 410. The user can narrow the area of the image used for the printing by pressing the trimming commit button 410 (user operation). Comparing with the image illustrated in FIG. 4, a left part of the image illustrated in FIG. 6 is trimmed. For example, even in a case where the print page is divided in the middle of a letter on the input image as illustrated in FIG. 4, fine adjustment for preventing the dividing in the middle of the letter can be made by removing an unnecessary part with the trimming function. Although the aspect ratio of the input image is changed by the trimming, the size in a width direction remains in 1500 mm. Thus, the length in a longitudinal direction of the roll paper is changed, and it is possible to make fine adjustment of the length in the longitudinal direction of the image. In the example of FIG. 6, since the total size in the width direction of 1500 mm is not changed, the image is actually elongated in the longitudinal direction by the trimming.

Figure 7:
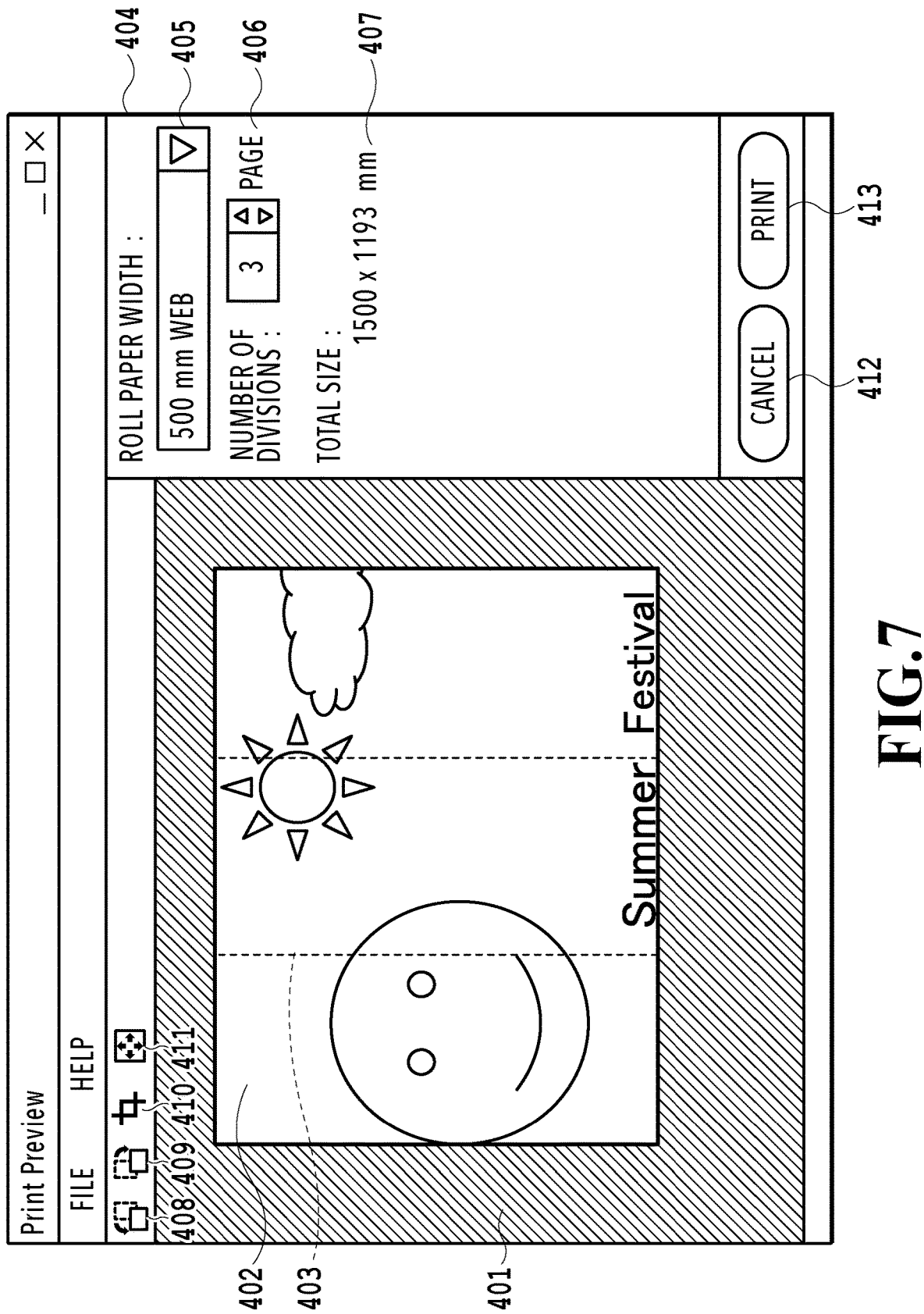
FIG. 7 illustrates the UI screen in a case where a white space of the image is removed.

FIG. 7 illustrates the UI screen displayed in a case where a white space of the image is removed by pressing the white space removal button 411. When the user presses the white space removal button 411, white space (white color) regions on the top, bottom, right, and left of the input image can be detected and removed. An example of a possible method of detecting white spaces includes converting the input image to RGB data once, checking pixel rows of the RGB data one by one from the outer side toward the inner side of the image to find a pixel with a color other than white, and determining as a white space a range of pixel rows outside a pixel row including the found pixel. Fine adjustment of the dividing position and the length in the longitudinal direction of the image can also be made by the above-described white space removal.

As described above, this embodiment makes it possible to perform the processing such as the image rotation, trimming, and white space removal on the UI screen of the layout software 104 while checking the preview display showing how the input image will be printed on the image representing the sheet. Thus, even in a case where the user has to go back to the screen of the drawing application 101 to adjust the image again, it is possible to process the image on the same screen as that of setting of the poster printing, and this can reduce time and effort of the user. In addition, since it is possible to remove the white spaces on the UI screen of the layout software 104, the user can readily remove the white spaces of the input image concurrently with setting of the poster printing without going back to the screen of the drawing application 101 and removing the white spaces of the input image. In particular, this embodiment is useful for a case where borderless printing including no white spaces is desired, for example.

In this embodiment, an example in which the dividing position and poster size are changed by the rotation, trimming, and white space removal; however, the present invention is not particularly limited thereto. For example, the layout software 104 may include a function of image processing such as changing the size by adding white spaces on the input image, or moving the position of an object in the input image so that the letter is not overlapped with the dividing position of the poster while maintaining the outer size of the input image.

Figure 8:
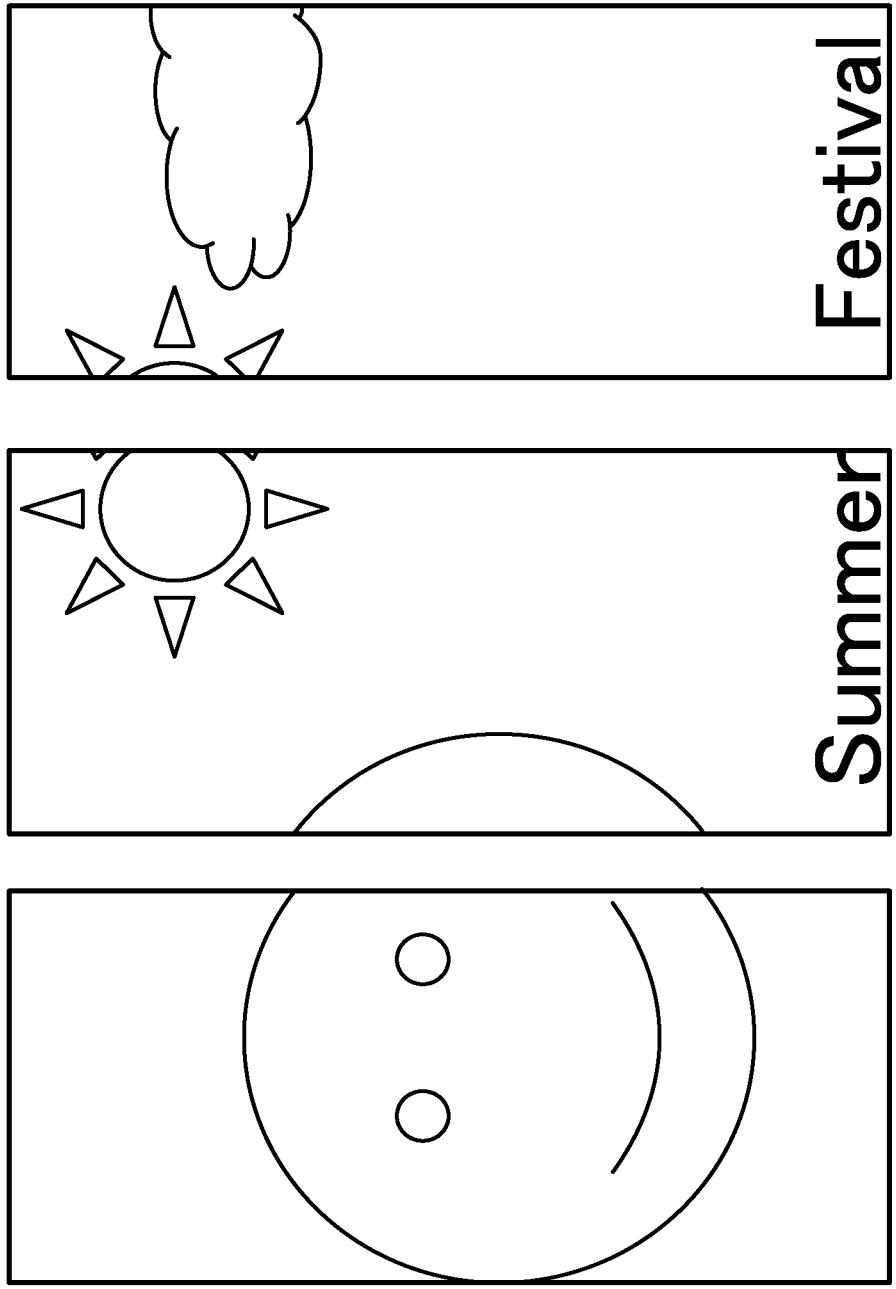
FIG. 8 is a diagram that illustrates an example of a print result in a case where number of poster divisions setting is set to 3.

FIG. 8 is a diagram that illustrates an example of a print result in a case where the number of divisions is set to "3" through the number of poster divisions setting item 406 after the white space removal. Comparing with the input image in FIG. 3, it can be seen that an image from which the top, bottom, right, and left white spaces are removed is divided into three pages and printed.

The layout software 104 of this embodiment obtains a width of the print region of each divided image based on at least the number of divisions and sheet width set by the user. Based on the obtained width of the print region of the divided image, a width of the print regions on the pasted sheets on which the divided images are respectively printed can be obtained. Thus, based on the width of the input image and the width of the print regions on the pasted sheets, the layout software 104 can obtain the scale factor of the input image, and the layout software 104 can further obtain a height of the print regions on the pasted sheets based on the obtained scale factor. Such calculation makes it possible to efficiently perform setting of the print region without forming unnecessary white spaces on the sheet supplied to the printing apparatus. In addition, based on the obtained width of the divided image, the layout software 104 displays the dividing line 403 as the guide information indicating the dividing position on the print preview of the input image. This makes it possible to readily check how will the input image be divided.

In this embodiment, the layout software 104 can perform setting of editing and processing on the image on the UI screen that displays the image with the dividing position by the preview function. In this embodiment, even in the case where the processing of the image is instructed, the scale factor of the processed and edited input image is obtained again based on the print region width on the pasted sheets, which is obtained based on the set number of divisions and sheet width, and the width of the processed and edited input image (after the processing instruction). Thus, even in the case where the input image is edited and processed, it is possible to efficiently perform setting of the print region without forming unnecessary white spaces on the sheet supplied to the print apparatus.

A calculating method of this embodiment is described below in detail with reference to FIG. 9. FIG. 9 is a flowchart that illustrates processing of the print setting by the layout software 104. Hereinafter, the processing of the print setting by the layout software 104 of this embodiment is described with reference to the flowchart.

For specific example, it is assumed to perform setting of bordered printing with the following values.

setting of borderless printing: off
width of input image (spool file): 400 mm
height of input image (spool file): 300 mm
roll paper width: 500 mm
number of poster divisions: 3
margin set in printing apparatus: 0 mm In the following processing, the layout software 104 may be described as an actor of the processing; however, actually the CPU 201 executes corresponding programs (programs of the layout software 104) to implement the corresponding functions. All of the processing are not necessarily executed sequentially in one process, and there may be a case where the OS once takes charge of the processing and then the processing is called back from the OS again. The flowchart is merely for conveniently and clearly illustrating the main processing of the layout software 104.

First, in S101, the layout software 104 obtains the set value (500 mm) set in the roll paper width setting item 405, and thereafter in S102, the layout software 104 obtains the set value (3) set in the number of poster divisions setting 406.

In S103, the layout software 104 obtains the width and height information of the input image (width 500 mm, height 400 mm), and in S104, the layout software 104 calculates the print region width on each divided page. The print region width on each divided page can be calculated by subtracting the margin value set in the printing apparatus from the roll paper width. In this embodiment, since the margin value set in the printing apparatus is 0 mm, the print region of each page is 500 mm.

However, the present invention is not limited to the above-described calculating method, and the print region width may be increased or decreased depending on the settings in different cases such as a case where a pasting margin is provided for pasting the sheets and a case of the borderless printing, for example.

Figure 10:
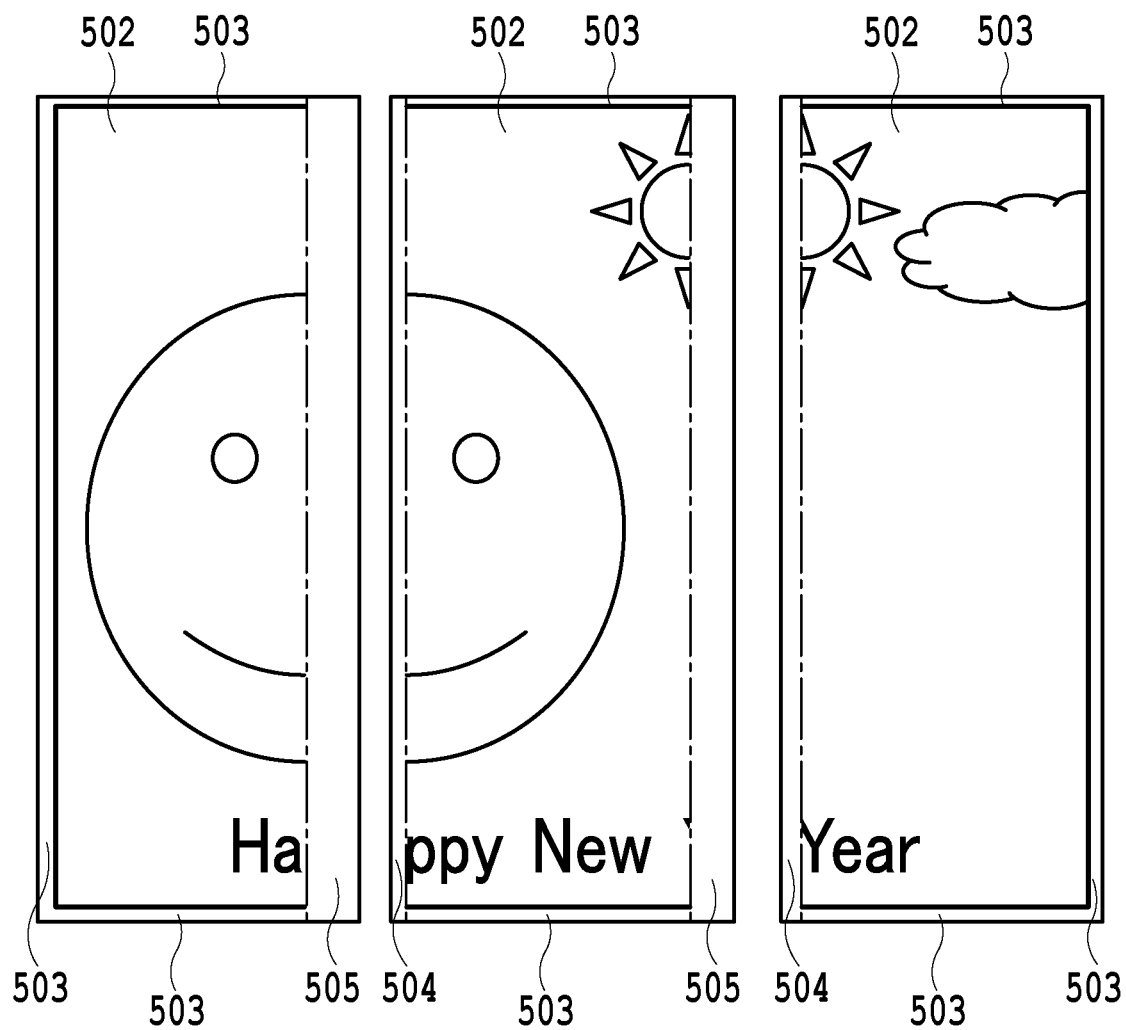
FIG. 10 is a schematic diagram that illustrates a print result.

FIG. 10 illustrates a schematic diagram that illustrates a print result of a case of the bordered printing. In the case of FIG. 10, printing apparatus margin regions 503 are provided on a left side of an image of the first page and a right side of an image of the last page. Cutting regions 504 are provided on all the pages except the first page. Pasting margin regions 505 are provided on all the pages except the last page.

In this case, assuming that the print region width on the first page is PageWidth1, the print region width on the second page is PageWidth2, and the print region width on the third page is PageWidth3, the print regions of the pages can be respectively calculated by the following expressions.

PageWidth1=roll paper width−margin value of left side−pasting margin width

PageWidth2=roll paper width−cutting width−pasting margin width

PageWidth3=roll paper width−cutting width−margin value of right side

Figure 11:
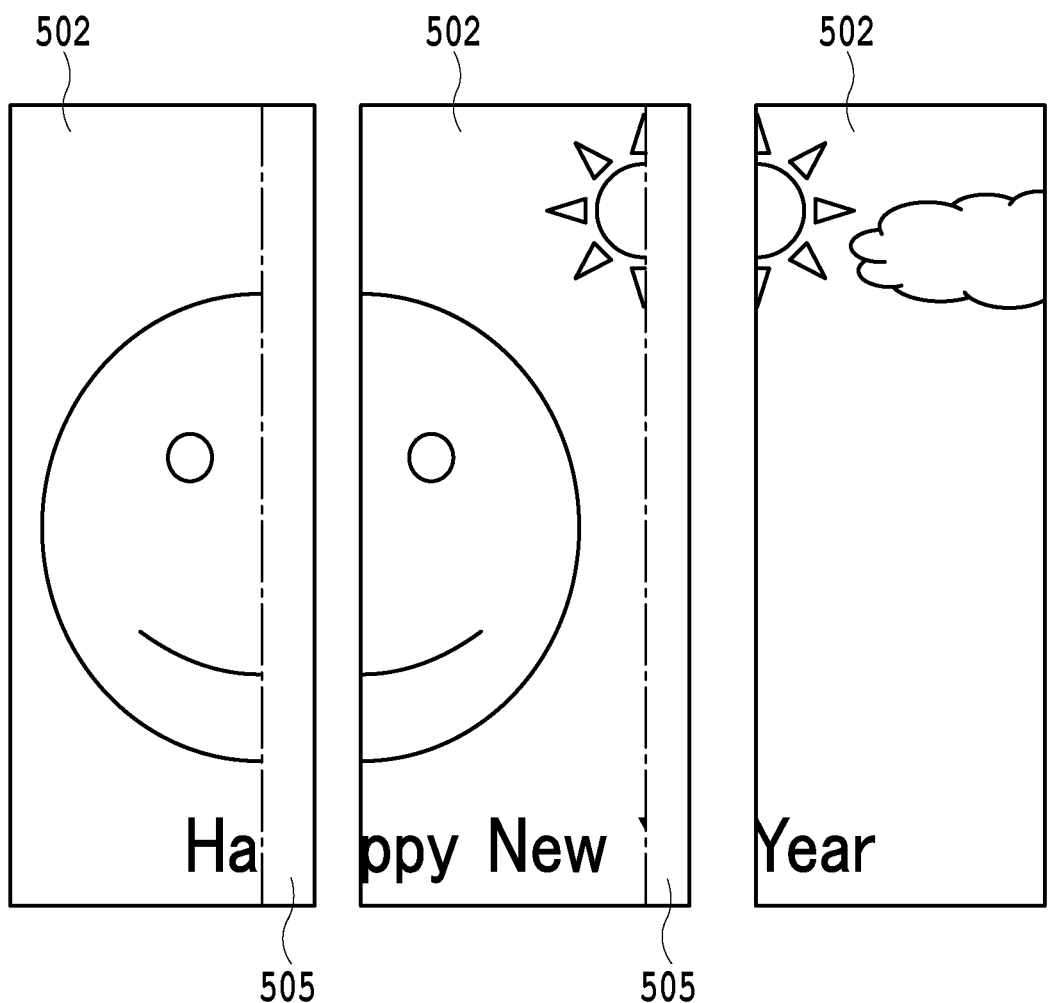
FIG. 11 is a schematic diagram that illustrates a print result.

FIG. 11 illustrates a schematic diagram that illustrates a print result of a case of the borderless printing. In the case of the borderless printing in FIG. 11, since the printing apparatus performing the borderless printing makes the printing extend beyond the sheet, data that is larger than the sheet size by the amount of extension is used for the printing. In other words, actually, a region extending beyond the sheet size is printed on a platen of the printing apparatus 2, and the sheet size on which the printing is made to its page edge is the final product. The print regions of the pages can be respectively calculated by the following equations.

PageWidth1=roll paper width+amount of extension of left side−pasting margin width PageWidth2=roll paper width+amount of extension of left side−pasting margin width PageWidth3=roll paper width+amounts of extension of left and right sides In S105, the layout software 104 calculates the print region width after pasting sheets. In this embodiment, since the three divided pages each having a print region width of 500 mm are pasted, 500×3=1500 mm is the print region width after pasting sheets.

Thereafter in S106, the layout software 104 calculates the scale factor of the input image required for the printing. The scale factor can be obtained by dividing the print region width after pasting sheets by the width of the input image. In this embodiment, 1500÷500=3 is the scale factor of the input image.

In S107, the layout software 104 calculates the print region height after pasting sheets. The print region height after pasting sheets can be obtained by multiplying the height of the input image by the scale factor obtained in S106, and is 400×3=1200 mm in this embodiment.

In S108, the layout software 104 allows the display regions 402, 403, and 407 to display the results based on the information determined in the previous processing. The display region 402 displays a result of the enlarged input image based on the print region width and height after pasting sheets calculated in S105 and S107.

The layout software 104 displays the dividing position as the dividing line 403 of the poster based on the information of the print region width on each page calculated in S104. Two boundaries are set in this embodiment: a first boundary is set at a position at a distance of the print region width on the first page (500 mm) from the left end of the region 402 to the right; and a second boundary is set at a position at a distance of the print region width on the second page (500 mm) from the position of the first boundary to the right.

In addition, the layout software 104 allows the poster total size display region 407 to display a value obtained by adding the width and height information of the print region after pasting sheets calculated in S105 and S107 with the margin value set in the printing apparatus. In this embodiment, since the margin value set in the printing apparatus is 0 mm, the width 1500 mm and the height 1200 mm are displayed. However, in a case where the borderless printing is selected, the borderless amount of extension may be taken into consideration instead of the margin value set in the printing apparatus.

Thereafter in S109, the layout software 104 determines whether the processing of the input image is instructed by pressing of the button 408 or 411. If the processing of the input image is instructed, the process proceeds to S110, and if there is no instruction, the process ends.

In a case of proceeding to S110, the layout software 104 performs the processing of the image according to the processing instruction in S109. In S111, the width and height of the processed image are obtained, and the process returns to S106. Based on the obtained width and height, the scale factor of the image and the print region height after pasting sheets are updated. In other words, the layout software 104 obtains the scale factor of the processed input image again based on the print region width after pasting sheets and the width of the processed input image. In addition, based on the height of the processed input image and the obtained scale factor, the print region height after pasting sheets can be obtained. If the number of divisions and sheet width are changed before and after the processing instruction, the print region width after pasting sheets may be obtained again based on the number of divisions and sheet width.

As an example of the recalculation after the image processing, for example, in a case where the input image is rotated 90 degrees as illustrated in FIG. 5, the processed image has the width of 400 mm and the height of 500 mm. In the example of FIG. 5, since the number of divisions and sheet width of the image are not changed before and after the processing instruction, the print region width after pasting sheets is not changed. Thus, in this case, the scale factor of the image is 3.75 obtained by dividing the print region width after pasting sheets (1500 mm) by the width of the processed image (400 mm). The print region height after pasting sheets is 1875 mm obtained by multiplying the height of the processed image (500 mm) by the scale factor (3.75).

As another example of the recalculation after the image processing, in a case where 50 mm of the left part of the input image is trimmed as illustrated in FIG. 6, the processed image has the width of 450 mm and the height of 400 mm. In the example of FIG. 6, since the number of divisions and sheet width of the image are not changed before and after the processing instruction, the print region width after pasting sheets is not changed. Thus, in this case, the scale factor of the image is 3.33 obtained by dividing the print region width after pasting sheets (1500 mm) by the width of the processed image (450 mm). The print region height after pasting sheets is 1332 mm obtained by multiplying the height of the processed image (400 mm) by the scale factor (3.33).

As another example of the recalculation after the image processing, a case where the top, bottom, right, and left white spaces of the input image are removed as illustrated in FIG. 7 and the processed image has the width of 440 mm and the height of 350 mm is considered. In the example of FIG. 7, since the number of divisions and sheet width of the image are not changed before and after the processing instruction, the print region width after pasting sheets is not changed. Thus, in this case, the scale factor of the image is 3.41 obtained by dividing the print region width after pasting sheets (1500 mm) by the width of the processed image (440 mm). The print region height after pasting sheets is 1193 mm obtained by multiplying the height of the processed image (350 mm) by the scale factor (3.41).

In this embodiment, the embodiment using the roll paper is described; however, for example, cut sheets of paper in a size customized for the poster printing may be prepared and used for the printing, and the present invention is not limited to the roll paper. In this embodiment, the embodiment in which an image of the actual print target is displayed on the screen for setting of the poster printing is described; however, the present invention is not limited thereto, and a configuration in which a simple image for preview is displayed on the screen may be applied, for example.

As described above, the layout software 104 is configured to enable the setting of the poster printing and the processing of the image to be concurrently performed on the UI screen that displays the image with the dividing position by the preview function. Even in a case where the size and the aspect ratio of the image are changed by the processing, the processed image is automatically fit to the width of a sheet, and also the height of the sheet is changed to a height of the enlarged image. This enables the setting of the poster printing and the processing of the image to be concurrently performed, and the printing without forming unnecessary white spaces on the print result can be controlled.

Second Embodiment

Hereinafter, a second embodiment of the present invention is described. The basic configuration of this embodiment is similar to that of the first embodiment; thus, only the characteristic configurations are described below.

The object of the present invention also can be achieved by supplying a storage medium storing program code of software that implements the functions of the above-described embodiment to a system or an apparatus and by using a computer (or CPU or MPU) of the system or the apparatus to read and execute the program code stored in the medium. In this case, the program code itself read from the storage medium implements the functions of the above-described embodiment, and the storage medium storing the program code constitutes the present invention.

For example, a flexible disk, hard disk, optical disk, magneto optical disk, CD-ROM, CD-R, magnetic tape, non-volatile memory card, ROM, DVD, and so on may be used as the storage medium for supplying the program code.

The functions of the above-described embodiment are not implemented only by executing the program code read by the computer. That is, there also may be a case where an operating system and the like operating on the computer performs a part of or all the actual processings based on the instruction of the program code to implement the functions of the above-described embodiment by the processings.

In addition, there also may be a case where, after the program code read from the storage medium is written in a memory provided in a function expansion board inserted in the computer or a function expansion unit connected to the computer, the functions of the above-described embodiment are implemented by performing the actual processings based on the instruction of the program code. There also may be a case where a CPU provided in the function expansion board or unit performs a part of the actual processings to implement the functions of the above-described embodiment by the processings.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-099974 filed May 24, 2018, which is hereby incorporated by reference herein in its entirety.

What is claimed is:

1. A control apparatus comprising:
    at least one processor causing the control apparatus to act as:
    an image obtaining unit that obtains one page as an input image;
    a setting unit that sets a number of divisions of the one page as the input image, based on user input;
    an obtaining unit that obtains a width of a sheet;
    a determining unit that determines a scale factor for expanding the input image based on at least (a) the set number of divisions, (b) the obtained width of the sheet, and (c) a width of the input image;
    a generation unit that generates a plurality of pages as a plurality of divided images from the one page as the input image by dividing the input image based on the set number of divisions, wherein a first page of the plurality of pages generated from the one page is printed on a first sheet, and wherein a second page of the plurality of pages generated from the one page is printed on a second sheet; and
    a display control unit that causes a display unit to display a screen in which (a) a preview of the input image and (b) an edit item for allowing a user to instruct edit processing for the input image are included,
    wherein in a case where the edit processing for the input image is instructed by the user through the edit item, the display control unit displays the input image that has been edited based on the edit processing, and the determining unit determines a scale factor for expanding the edited input image based on a width of the edited input image.

2. The control apparatus according to claim 1, wherein the display control unit causes the display unit further to display an editing setting screen including a setting item for the number of divisions that enables setting of the number of divisions of the input image, and
    wherein the setting unit sets the number of divisions based on information provided by the user input through the setting item for number of divisions.

3. The control apparatus according to claim 2, wherein the editing setting screen includes a sheet width setting item that enables setting of the width of the sheet.

4. The control apparatus according to claim 1, wherein the display control unit is capable of causing the display unit to display an estimate value of a total size of images on a pasted sheet on which the input image is dividedly printed.

5. The control apparatus according to claim 1, wherein the determining unit further obtains a print region width of each of the divided images based on (a) the set number of divisions and (b) the width of the sheet, and
    wherein the display control unit causes the display unit to display guide information indicating a dividing position on the preview screen of the input image based on the print region width of the divided image.

6. The control apparatus according to claim 1, wherein the edit item includes a rotation processing item that instructs processing of rotating the input image.

7. The control apparatus according to claim 1, wherein the edit item includes a trimming item that instructs processing of trimming the input image.

8. The control apparatus according to claim 1, wherein the input image is intermediate data in a predetermined format that is generated based on drawing data generated by a drawing application.

9. The control apparatus according to claim 1, wherein the determining unit obtains a print region width on a pasted sheet on which the divided images are printed based on (a) the set number of divisions and (b) the width of the sheet, and determines a scale factor of the input image based on (a) the print region width on the pasted sheet and (b) the width of the input image.

10. The control apparatus according to claim 9, wherein in a case where the edit processing of the input image is instructed, the determining unit newly obtains a print region width on the pasted sheet after the edit processing based on (a) the number of divisions of the input image after the edit processing and (b) a width of the sheet after the edit processing, and determines a scale factor of the edit processed input image using (a) the newly-obtained print region width and (b) the width of the edit processed input image.

11. A control method of a printing apparatus, the control method comprising the steps of:
    causing the printing apparatus to act by:
    obtaining one page as an input image;
    setting a set number of divisions of the one page as the input image, based on user input;
    obtaining a width of a sheet;
    determining a scale factor for expanding the input image based on at least (a) the set number of divisions, (b) the obtained width of the sheet, and (c) a width of the input image;
    generating a plurality of pages as a plurality of divided images from the one page as the input image by dividing the input image based on the set number of divisions, wherein a first page of the plurality of pages generated from the one page is printed on a first sheet, and wherein a second page of the plurality of pages generated from the one page is printed on a second sheet; and
    displaying a screen in which (a) a preview of the input image and (b) an edit item for allowing a user to instruct edit processing for the input image are included, wherein in a case where edit processing for the input image is instructed by the user through the edit item, the input image that has been edited based on the edit processing is displayed, and a scale factor for expanding the edited input image is determined based on a width of the edited input image.

12. The control method according to claim 11, wherein an editing setting screen is further displayed together with the preview of the input image, the editing setting screen including a setting item for number of divisions that enables setting of the number of divisions of the input image, and wherein the number of divisions is set based on information provided by the user input through the setting item for number of divisions.

13. The control method according to claim 12, wherein the editing setting screen includes a sheet width setting item that enables setting of the width of the sheet.

14. The control method according to claim 11, wherein an estimate value of a total size of images on a pasted sheet on which the input image is dividedly printed is displayed.

15. The control method according to claim 11, wherein a print region width on each of the divided images is further obtained based on (a) the set number of divisions and (b) the width of the sheet, and wherein guide information indicating a dividing position is displayed on the preview screen of the input image based on the print region width of the divided image.

16. The control method according to claim 11, wherein the edit processing includes a rotation processing that instructs processing of rotating the input image.

17. The control method according to claim 11, wherein the edit processing includes a trimming that instructs processing of trimming the input image.

18. The control method according to claim 11, wherein the input image is intermediate data in predetermined format that is generated based on drawing data generated by a drawing application.

19. The control method according to claim 11, wherein a print region width on a pasted print media on which the divided images are printed is obtained based on (a) the set number of divisions and (b) the width of the sheet, and a scale factor of the input image is determined based on (a) the print region width on the pasted sheet and (b) the width of the input image.

20. The control method according to claim 19, wherein in a case where processing of the input image is instructed, a print region width on the pasted sheet after the edit processing is newly obtained based on (a) the number of divisions of the input image after the edit processing and (b) a width of the sheet after the edit processing, and a scale factor of the processed input image is determined using (a) the newly-obtained print region width and (b) the width of the processed input image.

21. A non-transitory computer-readable storage medium storing a program for causing a computer to perform steps comprising:

obtaining one page as an input image;

setting a set number of divisions of the one page as the input image, based on user input;

obtaining a width of a sheet;

determining a scale factor for expanding the input image based on at least (a) the set number of divisions, (b) the obtained width of the sheet, and (c) a width of the input image;

generating a plurality of pages as a plurality of divided images from the one page as the input image by dividing the input image based on the set number of divisions, wherein a first page of the plurality of pages generated from the one page is printed on a first sheet, and wherein a second page of the plurality of pages generated from the one page is printed on a second sheet; and displaying a screen in which (a) a preview of the input image and (b) an edit item for allowing a user to instruct edit processing for the input image are included, wherein in a case where edit processing for the input image is instructed by the user through the edit item, the input image that has been edited based on the edit processing is displayed, and a scale factor for expanding the edited input image is determined based on a width of the edited input image.

22. The control method according to claim 11, wherein the first sheet and the second sheet are separated by cutting a roll sheet by a printer.

23. The control method according to claim 11, wherein a plurality of sheets on which the plurality of pages are printed respectively are to be pasted with each other.

* * * * *